(12) United States Patent
Boushy et al.

(10) Patent No.: US 6,993,494 B1
(45) Date of Patent: Jan. 31, 2006

(54) RESOURCE PRICE MANAGEMENT INCORPORATING INDIRECT VALUE

(75) Inventors: John M. Boushy, Henderson, NV (US); Timothy J. Wilmott, Mays Landing, NJ (US)

(73) Assignee: Harrah's Operating Company, Inc., Memphis, TN (US)

( * ) Notice: Subject to any disclaimer, the term of this patent is extended or adjusted under 35 U.S.C. 154(b) by 527 days.

(21) Appl. No.: 09/658,366

(22) Filed: Sep. 8, 2000

Related U.S. Application Data

(63) Continuation-in-part of application No. 09/088,423, filed on Jun. 1, 1998, now Pat. No. 6,183,362.

(51) Int. Cl.
*G06F 17/60* (2006.01)

(52) U.S. Cl. ............................ 705/10; 705/400; 705/14
(58) Field of Classification Search ................ 705/400, 705/14
See application file for complete search history.

(56) References Cited

U.S. PATENT DOCUMENTS

| | | | | |
|---|---|---|---|---|
| 4,910,677 A | * | 3/1990 | Remedio et al. ............... 700/92 |
| 5,255,184 A | | 10/1993 | Hornick et al. ............. 364/407 |
| 5,270,921 A | | 12/1993 | Hornick ...................... 364/407 |
| 5,722,893 A | * | 3/1998 | Hill et al. ...................... 463/47 |
| 5,761,647 A | * | 6/1998 | Boushy ........................ 705/10 |
| 5,918,209 A | * | 6/1999 | Campbell et al. ............... 705/5 |
| 6,003,013 A | | 12/1999 | Boushy et al. ................ 705/10 |
| 6,049,774 A | | 4/2000 | Roy ............................... 705/8 |
| 6,183,362 B1 | * | 2/2001 | Boushy ........................ 463/25 |
| 6,253,187 B1 | | 6/2001 | Fox .............................. 705/10 |
| 6,263,315 B1 | | 7/2001 | Talluri ........................... 705/8 |
| 6,327,573 B1 | * | 12/2001 | Walker et al. ................ 705/14 |
| 6,424,949 B1 | * | 7/2002 | Deaton et al. ................ 705/14 |

FOREIGN PATENT DOCUMENTS

JP  404077958 A  *  3/1992

OTHER PUBLICATIONS

Entertainment Industry Economics: A Guide for Financial Analysis– Jul. 1998.*
Going for Broke Casino Hotels Lure $100,000 Gamblers with Extravagant Suites. Arizona Republic (AR) Monday Mar. 2, 1987– By: Associated Press–Edition: Final Section: Economy p.: c3.*
Musgrave, Gerald L., "Entertainment Industry Economics: A Guide for Financial Analysis (book reviews)," Business Economics, vol. 33, No. 3, p. 68 (2), Jul., 1998 (2 pages).
Konik, Michael, "The Best of Las Vegas. (Includes tips on the best and the worst times to visit Las Vegas, NV)," Los Angeles Magazine, vol. 42, No. 6, p. 73 (8), Jun., 1997 (7 pages).
Binkley, Christina, "A Day with a High Roller," Wall Street Journal, Col. 2, p. 1, Sec. W, Friday, May 1, 1998 (4 pages).
Kuyumcu, A. H., "Gaming with Revenue Management," Talus Solutions, Inc., Scorecard Growth Strategies for the Information Age, Technical Brief, pp. 1–8, Summer, 2000.

(Continued)

*Primary Examiner*—John W. Hayes
*Assistant Examiner*—Daniel L. Greene
(74) *Attorney, Agent, or Firm*—Fenwick & West LLP

(57) ABSTRACT

A method and system of managing value from a resource such as hotel rooms by taking into account indirect value, such as gaming value, in determining recommended bid prices. Observed and/or estimated indirect value for customers is obtained. Recommended bid prices for instances of the resource, such as hotel rooms, are adjusted based on the obtained indirect value. Prices are further adjusted based on competitive market conditions.

37 Claims, 7 Drawing Sheets

OTHER PUBLICATIONS

Donaghy, K., McMahon, U., and McDowell, D., "Yield Management: an overview," International Journal of Hospitality Management, vol. 14, No. 2, pp. 139–150, 1995.

Dunn, K. D., and Brooks, D. E., "Profit Analysis: Beyond Yield Management," The Cornell Hotel and Restaurant Administration Quarterly, vol. 31, No. 3, pp. 80–90, Nov., 1990.

Hanks, R. D., Cross, R. G., and Noland, R. P., "Discounting in the Hotel Industry: A New Approach," The Cornell Hotel and Restaurant Administration Quarterly, vol. 33, No. 1, pp. 15–23, Feb., 1992.

Jauncey, S., Mitchell, I., and Slamet, P., "The Meaning and Management of Yield in Hotels," International Journal of Contemporary Hospitality Management, vol. 7, No. 4, pp. 23–26, 1995.

Kimes, S. E., "Yield Management: A Tool for Capacity-Constrained Service Firms," Journal of Operations Management, vol. 8, No. 4, pp. 348–363, Oct., 1989.

Lieberman, W. H., "Debunking the Myths of Yield Management" [online] [retrieved on May 15, 2001]. Retrieved from the Internet: <URL: www.abovetheweather.com/ym_myths.pdf>. (First appeared in The Cornell H.R.A. Quarterly, pp. 34–41, Feb., 1993).

Orkin, E. B., "Boosting Your Bottom Line with Yield Management," The Cornell Hotel and Restaurant Administration Quarterly, vol. 28, No. 4, pp. 52–56, Feb., 1988.

Orkin, E. B., "Strategies for Managing Transient Rates," The Cornell Hotel and Restaurant Administration Quarterly, vol. 30, No. 4, pp. 34–39, Feb., 1990.

Relihan III, W. J., "The Yield–Management Approach to Hotel–Room Pricing," The Cornell Hotel and Restaurant Administration Quarterly, vol. 30, No. 1, pp. 40–45, May, 1989.

Weatherford, L. R., "Using Prices More Realistically as Decision Variables in Perishable–Asset Revenue Management Problems," Abstract, Journal of Combinational Optimization [online]. Oct. 1997, 1(3):277–304. [retrieved on May 15, 2001]. Retrieved from the Internet: <URL: http://www.wkap.nl/oasis.htm/144927>.

Brumelle, S. L., McGill, J. I., "Airline Seat Allocation with Multiple Nested Fare Classes," Operations Research, Operations Research Society of America, vol. 41, No. 1, pp. 127–137, Jan.–Feb. 1993.

Brumelle, S. L., McGill, J. I., Oum, T. H., Sawaki, K., and Tretheway, M. W., "Allocation of Airline Seats Between Stochastically Dependent Demands," Transportation Science, Operations Research Society of America, vol. 24, No. 3, pp. 183–192, Aug. 1990.

Chapman, S. N., and Carmel, J. I., "Demand/Capacity Management in Health Care: An Application of Yield Management," Health Care Management Review, vol. 17, No. 4, pp. 45–54, Fall 1992.

Curry, R. E., "Optimal Airline Seat Allocation with Fare Classes Nested by Origins and Destinations," Aeronomics Incorporated, pp. 1–22, Jun. 1989.

Curry, R. E., "Real–Time Revenue Management," Technical Brief, Aeronomics Incorporated, pp. 1–4, Second Quarter 1992.

Vinod. B., "Reservation Inventory Control Techniques to Maximize Revenues," The Third International Airline Yield Management Conference, Dec. 3, 1990.

Belobaba, P. P., "Application of a Probabilistic Decision Model to Airline Seat Inventory Control," Operations Research, vol. 37, No. 2, pp. 183–197, Mar.–Apr. 1989.

Bitran, G. R. and Mondschein, S. V., "An Application of Yield Management to the Hotel Industry Considering Multiple Day Stays," Operations Research, vol. 43, No. 3, pp. 427–443, May–Jun. 1995.

Harris, F. and P. Peacock, ""Hold My Place, Please" Yield Management Improves Capacity–Allocation Guesswork," Marketing Management, vol. 4, No. 2., pp. 34–46, Fall 1995.

Wollmer, R. D., "An Airline Seat Management Model for a Single Leg Route When Lower Fare Classes Book First," Operations Research, vol. 40, No. 1, pp. 26–37, Jan.–Feb. 1992.

\* cited by examiner

6.12 Recommendations Review

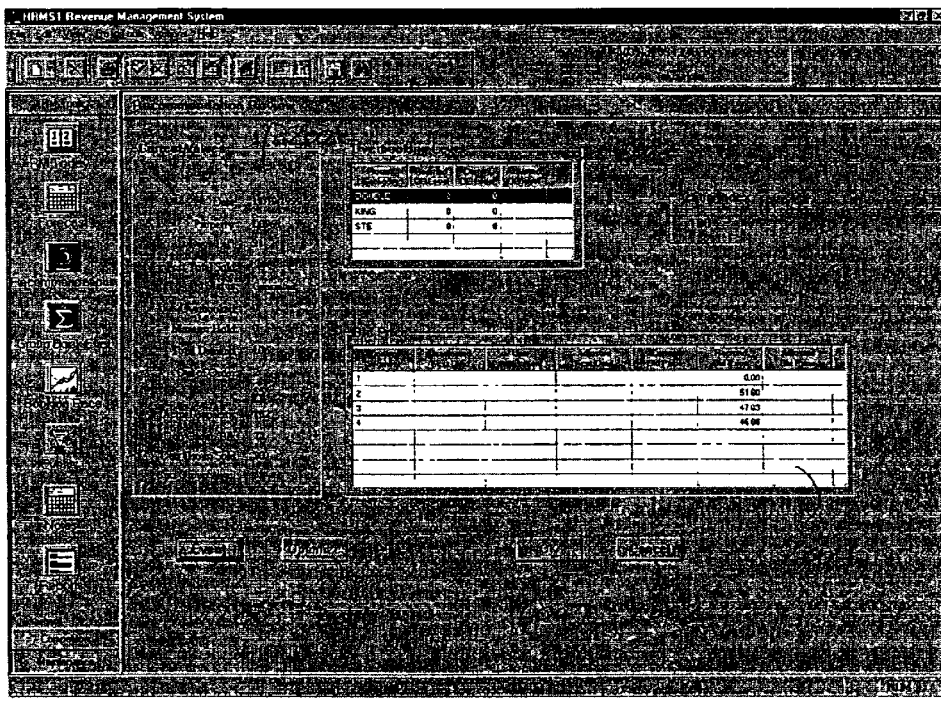

FIG. 4

Note: The following data fields will be included on the screen for each Room Category to aid in the overbooking analysis:

- Current Sold
- Forecasted Sold
- Forecasted No-shows
- Capacity

Also, Remaining Sold Forecast will be added to this screen.

A description of each Control Segment will be displayed at the bottom of this screen.

Business Objective

The Recommendations Review screen gives the user the ability to review and modify the current Bid Price and Overbooking recommendations. When the RM chooses to adjust the forecasted demand or the Bid Price, they right click on the targeted recommendation. A pop-up screen, displayed below, enables the RM to modify the forecast or the Bid Price.

Primary User
Property User
Normal Flow of Events

6.13 Adjust Bid Price

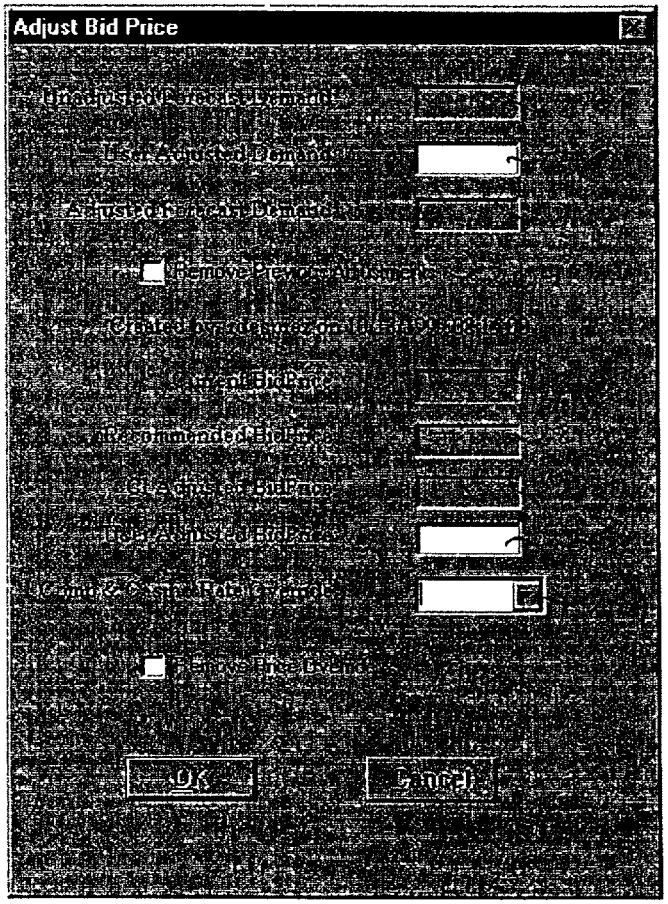

FIG. 5

Note: a description of the DOW/Room Category/Control Segment will be included at the top of this screen, identifying the Control Segment that is being displayed.

Also, Remaining Sold Forecast will be added to this screen.

Business Objective

The Adjust Bid Price screen gives the user the ability to adjust the forecasted demand or the Bid Price. It also gives the user to ability to review previously adjusted Bid Prices, or adjusted forecast demand. The user can also disable a previous adjustment.

Primary User

Property User

Normal Flow of Events

RESOURCE PRICE MANAGEMENT INCORPORATING INDIRECT VALUE

CROSS-REFERENCE TO RELATED APPLICATIONS

The present application is a continuation-in-part of U.S. patent application Ser. No. 09/088,423, for "National Customer Recognition System and Method," filed Jun. 1, 1998 now U.S. Pat. No. 6,183,362, the disclosure of which is incorporated herein by reference.

The present application is related to U.S. Pat. No. 5,761, 647, for "National Customer Recognition System and Method," filed May 24, 1996, issued on Jun. 2, 1998, the disclosure of which is incorporated herein by reference.

The present application is further related to U.S. Pat. No. 6,003,013, for "Customer Worth Differentiation by Selective Activation of Physical Instrumentalities Within the Casino," filed May 29,1998, issued on Dec. 14, 1998, the disclosure of which is incorporated herein by reference.

BACKGROUND OF THE INVENTION

1. Field of the Invention

The present invention is related to resource and revenue management, and more particularly to a system and method of optimizing prices for a resource such as hotel rooms, that takes into account multiple sources of value for customer segments, such as direct and indirect value (e.g. derived from gaming revenue).

2. Description of the Background Art

In many industries, providers of products and/or services fail to take into account indirect value that derives from the sale of the product or service, when determining a price for a particular customer or customer segment. Examples of such indirect value include advertising revenue, increased sales of related or unrelated goods or services, increased website traffic, increased revenue from related or unrelated business enterprises, and the like. Though such sources of indirect value can be quantified based on customer segment, demographic and/or psychographic categorization, observed or predicted behavior, and the like, existing revenue management systems fail to take into account such sources of indirect value in a systematic manner when determining whether or not to offer a resource to a particular customer or customer segment, or when determining a price point for offering such a resource to a particular customer or customer segment.

One example where such indirect value is a substantial component of overall profitability is the casino/hotel industry. Casinos and hotels are often affiliated with one another, and in many cases are operated by the same company. Most casino/hotel operators recognize that potential income from the casino often far exceeds income from renting rooms at the hotel; yet the hotel component of the business endeavor is a necessary element to attract customers. Thus, many such operators are content to make little or no profit (or even lose money) on their room prices in order to attract customers; the operators rely on increased casino profits from these customers to offset the discounted room prices. As a common enterprise, casino/hotel operators are primarily interested in maximizing total profits, and are willing to take a loss on the hotel operations in order to achieve a greater total profit.

In general, customers may be divided into segments having distinct characteristics and potential revenue or other value. For example, overnight visitors generate higher gaming revenues (i.e., provide greater gaming value) than do day trip visitors. A visitor on an overnight trip tends to do the largest share of his or her gaming at the casino associated with his or her hotel. Accordingly, casino/hotel operators whose hotel customers include those overnight visitors having the highest gaming value generally enjoy the highest casino revenues.

In many areas where gaming is prevalent, hotel rooms are scarce, and customers are often turned away. Casino/hotel operators try to determine how many rooms to rent at which price points, in an attempt to maximize revenue. Conventionally, room prices vary based on several factors, including class of room, special events, and availability. Operators forecast the number of rooms in demand at future dates, and set room prices based on these factors. Thus, for periods of high demand, higher room prices may be charged.

However, conventional techniques for setting room prices fail to take into account the potential gaming value of particular customer segments as compared with other customer segments. For example, higher-rated gaming players (i.e., those that belong to a customer segment associated with a higher level of casino profits) are more valuable to a casino/hotel operator than are lower-rated gaming players or non-players. Industry analysis has shown that 26% of casino customers provide 82% of gaming revenues. Thus, where accommodations are scarce, it would be advantageous for hotel/casino operators to favor higher-value customers over lower-value customers. Conventional room pricing methods fail to take into account the relative gaming value of customers.

Furthermore, many higher-rated gaming players book room reservations relatively late, within only a few days of their intended stay. If a hotel is already full by the time the higher-rated player wishes to book a room, the higher-rated player will be turned away. The result is that the room is occupied by a lower-valued customer (who booked earlier) instead of the higher-valued customer. A net loss in total revenues results, due to the failure to take into account the gaming value of each potential hotel customer when pricing or offering the room. Indeed, in some cases, it may be desirable not to rent the room to a lower-valued customer at all, and instead hold open the room for a possible later-booking higher valued customer.

In addition, current systems, both in the casino/hotel industry and in other industries fail to take into account total potential customer value, including indirect value, in determining whether or not to target a marketing campaign at a customer or customer segment, based on indirect value for the customer or customer segment, or on total value including direct and indirect value. As a result, services and/or goods are offered to potential customers without regard to a determined or estimated total value, including indirect value. As a result, such businesses suffer from misallocation of scarce resources, as well as a lack of op timization and profit maximization.

What is needed is a system and method of determining whether or not to offer a resource to a customer or customer segment, based on indirect value for the customer or customer segment, or on total value including direct and indirect value.

What is further needed is a system and method of determining a price at which to offer a resource to a customer or customer segment, based on indirect value for the customer or customer segment, or on total value including direct and indirect value.

What is further needed is a system and method of determining whether or not to target a marketing campaign at a customer or customer segment, based on indirect value for the customer or customer segment, or on total value including direct and indirect value.

What is further needed is a system and method of determining a room price for a hotel room that takes into account the gaming value, and/or other indirect value, of a potential hotel customer or customer segment. What is needed is a system and method that makes recommendations as to whether a particular is room should be rented to a particular customer or customer segment, based at least in part on the customer's (or customer segment's) gaming value and/or other indirect value.

SUMMARY OF THE INVENTION

The present invention manages and optimizes total customer value by taking into account indirect value and/or total value for a customer or customer segment, in making a determination as to whether or not to offer a resource to the customer of customer segment. The invention further provides functionality for determining an offer price for a customer or customer segment, based on in direct value and/or total value for the customer or customer segment. Thus, in one embodiment, the invention optimizes prices for a resource such as hotel rooms, by taking into account gaming revenue or other indirect value for potential hotel customers or customer segments. This optimization is performed, for example, at the time a price is requested for or by the potential customer, so that an optimal price can be determined based on particular characteristics of the customer or of the segment to which the customer belongs. In determining the optimal price, total value, including for example hotel revenue and gaming value, is taken into account for each potential customer.

The present invention can be applied to allocation and pricing for any resource having multiple quantifiable sources of value, such as direct and indirect value that are capable of being determined, estimated, or predicted. For example, tickets to entertainment events, hotel services, and other resources may be dynamically priced, taking into account indirect value such as shopping, dining, and the like, for the customer or customer segment. The determined indirect value may be based on demographic and/or psychographic characteristics, observed and/or predicted behavior, or other factors.

When a request for a resource (such as a hotel room) for a customer is received, (either from the customer directly or from some agent on behalf of the customer) a resource price (such as a room rate) is determined based on various factors. According to the present invention, the resource price takes into account as one of the factors the indirect value (such as gaming revenue) and/or total value of the customer. This indirect value is preferably determined based on information accumulated and derived from, or predicted by, the behavior (such as gaming behavior) of the customer or customer segment to which the customer belongs, and/or on other demographic, psychographic, and/or other factors and characteristics. The invention thus takes into account, in determining whether or not to offer the resource to the customer and when setting the resource price, the potential or expected indirect value (such as revenue received from the customer's expected gaming activities).

For example, in the context of setting hotel room prices, customers who have high gaming value, and thus are likely to generate high gaming revenue during their visit, may receive a discounted room price; conversely, customers with lower gaming value receive a higher (or less discounted) room price. In this manner, the overall revenue of the casino and hotel can be managed more efficiently.

The determination of gaming value may be made at the level of the individual customer or by categorization of the customer into an appropriate customer segment. Thus, in one embodiment, potential customers are classified into customer segments, based on observed behavior and other characteristics affecting indirect value. In the context of a hotel/casino operation, for example, such information may be derived from observation of the type of games and length of time the customer plays, amounts bet, demographics, and the like. Based on the determined segment for a customer, which in turn reflects a measure of the indirect value of the customer, an appropriate hotel price is quoted for the customer.

Customer segments can be defined in any manner appropriate to the particular implementation of the invention. In general, the invention allows each customer segment to be evaluated separately in a value-maximizing manner. For example, in a casino/hotel implementation, customers' gaming behavior is tracked in a database, according to techniques described in related U.S. Pat. No. 5,761,647, for "National Customer Recognition System and Method," filed May 24, 1996, issued on Jun. 2, 1998, and U.S. patent application Ser. No. 09/088,423, for "National Customer Recognition System and Method," filed Jun. 1, 1998. The database houses general information about the customer, including name, address, phone number, birthday, and the like. Identity cards are issued to customers, and customers are encouraged (by incentives, for example) to present their cards when gaming at the casino. Dealers or slot machines provide information to the database describing the gaming behavior of the customer. From this information, game preference, average bet, length of play, estimated gaming value, and customer segment is determined. This information can then be used for marketing purposes, as well as providing input to the resource management system for developing a recommended bid price (price at which the room is offered) based on gaming value.

In one embodiment, where a set of predefined prices (such as hotel room rates) exists for a resource, the recommended price may be adjusted to the next highest predefined price.

The present invention thus optimizes the allocation and pricing of resources in order to ensure that higher-value customers are given preferential access and more attractive prices, so as to maximize total profit, revenue, or value. In one embodiment, additional factors may be considered in determining prices, such as projected demand, special events, and the like Prices are discounted based on indirect value (and/or total value) of the customer, in order to offer higher-value customers a preferential price. This is done, for example, by subtracting a measure of indirect value (such as expected gaming revenue) for the customer's customer segment from the initial offering price for the resource. In some cases where indirect value is sufficiently high, the customer may be offered the resource at no charge.

The present invention further provides functionality for targeting marketing efforts. By taking into account a determined or estimated indirect value for a customer or customer segment, the invention determines whether or not to target a marketing campaign at a customer or customer segment, and determines an offer price for the customer or customer segment.

BRIEF DESCRIPTION OF THE DRAWINGS

FIG. 4 is a screen shot of a recommendations review screen for a user interface according to the present invention.

FIG. 5 is a screen shot of an adjust bid price screen for a user interface according to the present invention.

Figure 1:
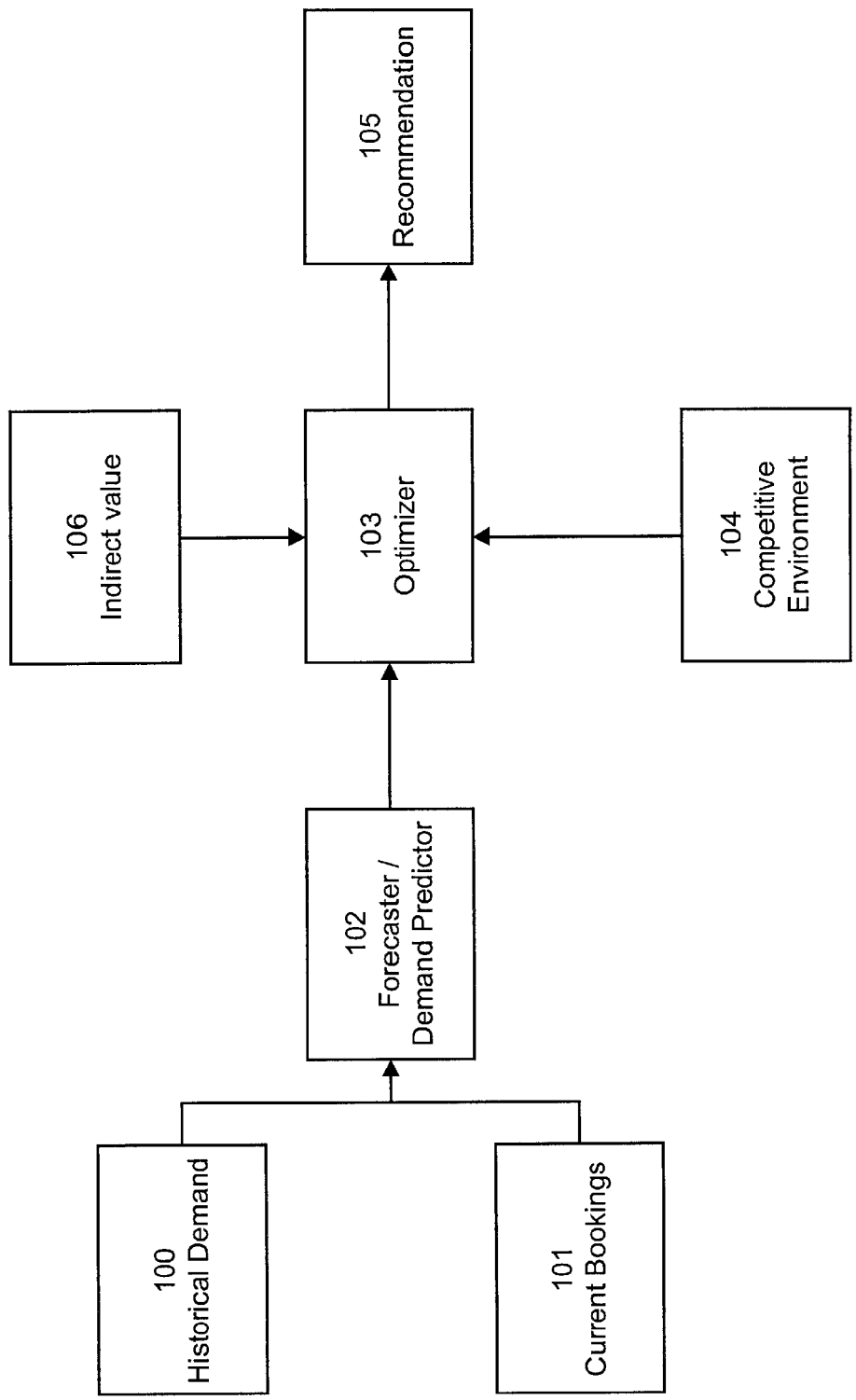
FIG. 1 is a conceptual block diagram of the functional components of the invention according to one embodiment.

The drawings provided herein are merely illustrative of one embodiment of the invention. One skilled in the art will recognize that many other architectures, process implementations, and screen designs are possible without departing from the spirit or essential characteristics of the invention.

DETAILED DESCRIPTION OF THE PREFERRED EMBODIMENTS

Definitions

For the purposes of the following description of the preferred embodiments, the following terms are defined. These definitions are not intended to limit or restrict the scope of the present invention, whose scope is defined solely the claims.

Resource: A quantifiable, saleable commodity or service that is typically provided to a customer in exchange for payment. In the context of this invention, resources are assumed to be finite in quantity and/or availability. Examples: hotel rooms, air travel, concert tickets, soap, tomatoes.

Value: Quantifiable benefit to the provider of the resource, deriving directly or indirectly from a customer's consumption of the resource. Examples: revenue, profits, advertising exposure, public relations.

Customer segment: A subset of customers or potential customers, based on some common characteristic. May include zero or more customers or potential customers. Any number of customer segments may be defined for the set of all customers or potential customers.

Direct value (primary value): Revenue, profit, or other value collected directly from customers and deriving directly from sale of the resource. Examples: room rates (for hotel rooms), airfare (for air travel), selling price (for goods). May be measured, for example, in terms of gross revenue or profits; may or may not take into account costs of providing the resource.

Indirect value (secondary value): Any additional revenue, profit, or other value, aside from the direct value, that results from the customer's purchase, consumption, or use of a resource. Examples: gaming revenue resulting from a hotel room stay, advertising exposure resulting from purchases of associated goods, expected gift shop revenue resulting from a theme park admission. May be measured, for example, in terms of gross revenue or profits; may or may not take into account costs of providing the resource. May represent value associated with an increased probability of additional revenue. May be determined on an individual customer-by-customer level, or on a segment-by-segment level.

Actual indirect value: Measured indirect value (such as revenue) for a particular customer or customer segment, determined for example from past resource use, purchases, consumption or transactions.

Expected (or predicted) indirect value: Indirect value that can be reasonably expected from a particular customer or customer segment for a particular purchase, consumption, use, or transaction. Expected indirect value may be based, for example, on one or more of actual indirect value (such as revenue from past purchases) and/or predictions based on any available information about the customer or customer segment, such as demographic characteristics, psychographic characteristics, and/or specific historical transactions. In one embodiment, the expected indirect value is determined using a predictive model.

Total actual value: The sum of direct value and actual indirect value.

Total expected value: The sum of direct value and expected indirect value.

Functional Components

The following description illustrates the invention in the context of a system for of allocating and pricing hotel rooms by taking into account gaming value of potential hotel customers. However, the present invention can be applied to allocation and pricing for any resource having a source of indirect value, and is not intended to be limited to hotel room management and pricing. Accordingly, the context of the following description is not intended to limit in any way the scope of the invention, which is defined solely by the claims.

In one embodiment, the present invention takes into account multiple sources of value, including direct and indirect value, in order to determine how to allocate and price hotel rooms for a casino/hotel operation. The indirect value may be determined based on actual historical data tracking predictive modeling, estimates, demographics, psychographics, and/or any other relevant factors. Customer segmentation may be employed in order to determine and provide such indirect value measurements.

Referring now to FIG. 1, there is shown a conceptual block diagram of the functional components of the invention according to one embodiment. In one embodiment, the various functional elements of FIG. 1 are implemented as software components running on a conventional personal computer, as is known in the art.

Optimizer 103 generates a recommendation 105 in response to a resource request for a particular customer or customer segment. Recommendation 105 includes, for example, an indication as to whether the resource should be made available to the customer or customer segment, and/or a recommended price for the resource.

For illustrative purposes, FIG. 1 shows examples of the types of input that may be provided to optimizer 103 in generating recommendation 105. One skilled in the art will recognize that the illustrated input types are merely exemplary, and that other factors may be taken into account in generating recommendation 105. In the illustrated embodiment, historical demand 100 and current bookings 101 are provided to a forecaster/demand predictor 102, which forecasts demand for particular customer segments. Indirect value 106 (such as customer gaming value), along with forecasted demand developed by predictor 102, are provided to optimizer module 103. As described above, indirect value may represent actual measured value, estimated value, or any combination thereof. Indirect value 106 may be provided according to individual customers, or according to customer segments, as desired. A further input that may be provided to optimizer 103 is an indicator of competitive market pressures or other environmental factors, such as prices for similar resources available from competitors (e.g. room prices at competing hotels). Additional input and adjustments may also be provided such as for example an indication of expected or actual demand cycles, so as to increase prices when demand is strong.

Taking into account input from predictor 102, indirect value 106, and data describing the competitive environment 104), optimizer 103 generates a recommendation as to the appropriate resource allocation and prices, in order to maximize total value. Recommendation 105 may be in the form of a price to offer to a customer, or a recommendation that the resource not be made available to the customer.

Thus, in the context of a casino/hotel operation, recommendation 105 ensures availability for high-gaming-value customers when appropriate, and makes appropriate trade-offs to ensure availability for mid-gaming-value customers when appropriate.

Resource Pricing

Figure 2A:
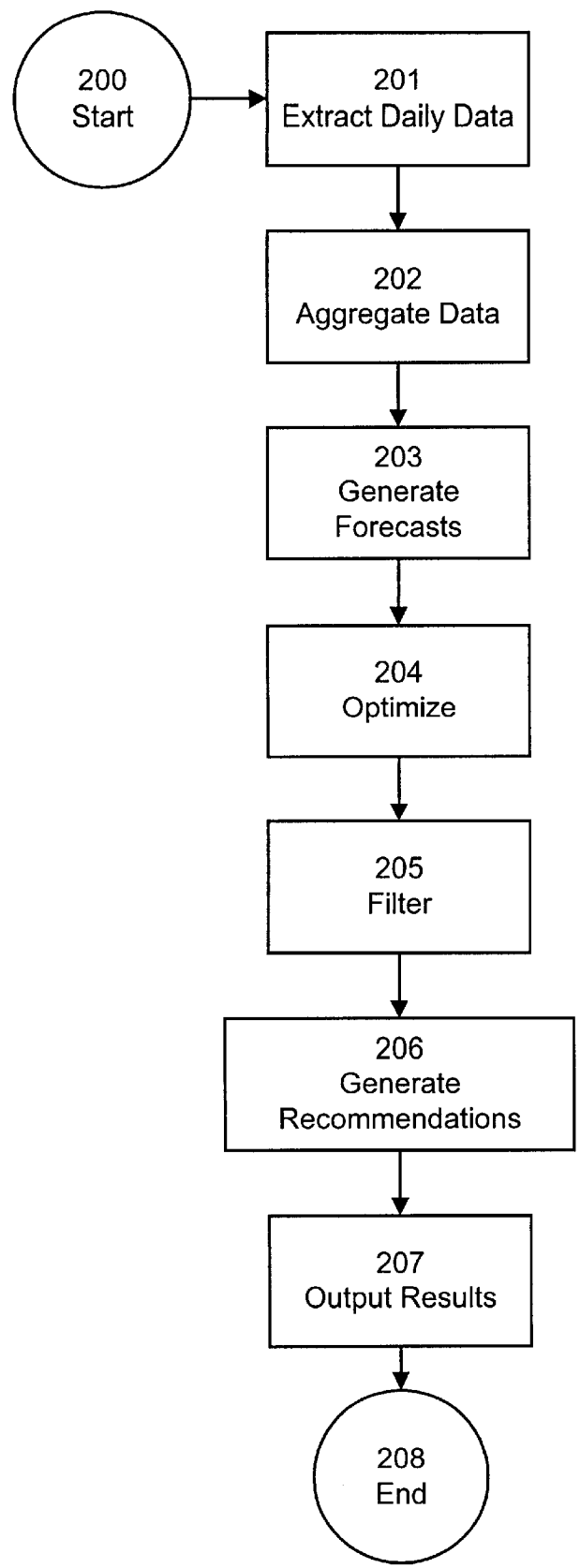
FIG. 2A is a flow chart showing overall operation of a revenue management system employing the present invention.
Figure 2B:
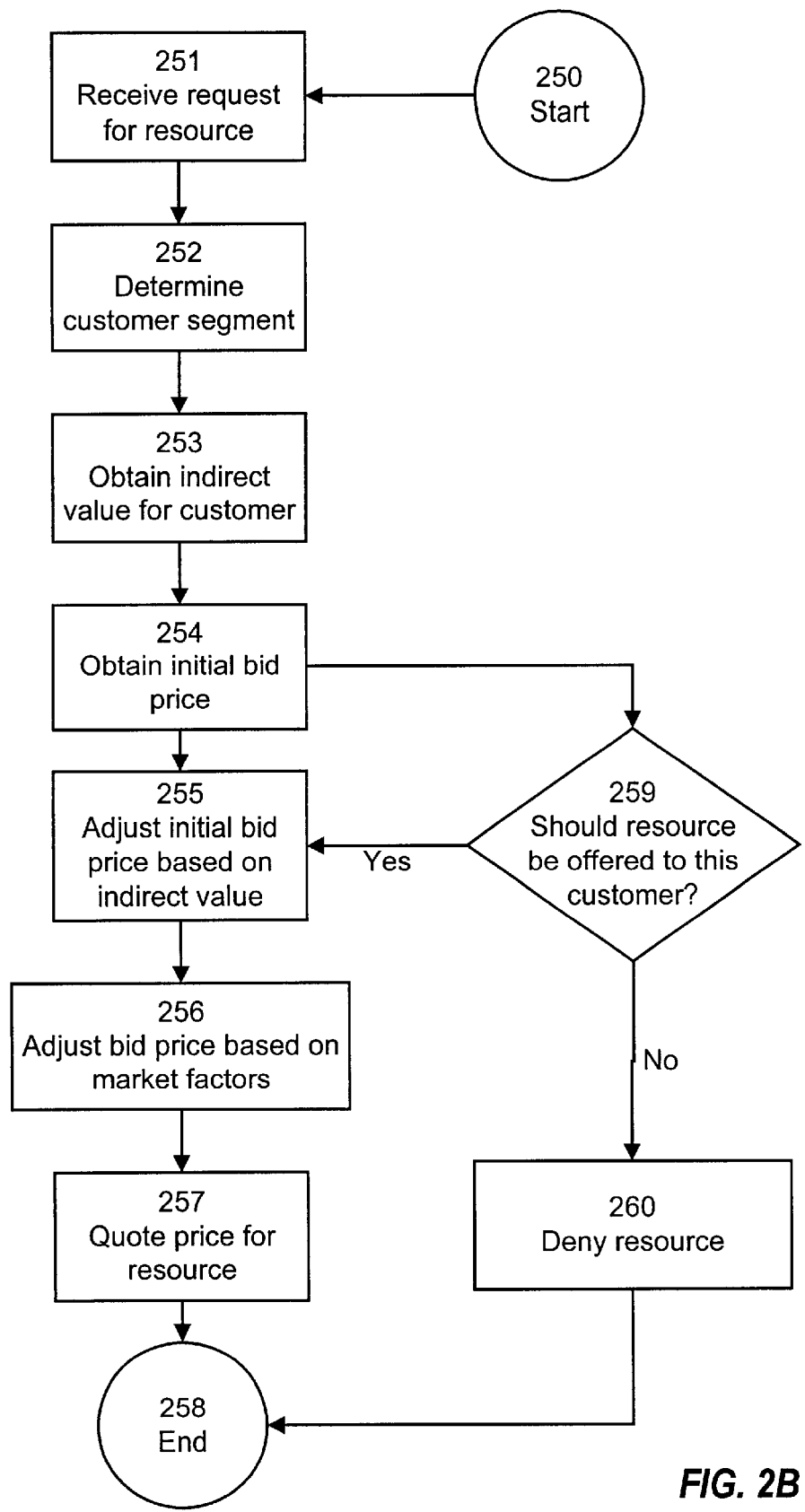
FIG. 2B is a flow chart showing a process of generating a price for a resource according to one embodiment of the present invention.

Referring now to FIG. 2B, there is shown a flow chart depicting a process of generating a price for a resource according to one embodiment of the present invention. In the context of a casino/hotel operation, for example, the steps of FIG. 2B may be performed when a customer, potential customer, or sales agent requests a hotel room at a particular hotel property.

The request for the resource (such as the hotel room) is received 251 by the system. In one embodiment, a customer segment for the customer is determined 252. The segment may be defined, for example in terms of various characteristics of the customer. As described in more detail below, these characteristics may include behavioral, demographic, psychographic, or other descriptive factors. Customer segmentation allows the resource pricing implemented by the present invention to be performed on a segment-by-segment basis, so that once a particular customer's segment is determined, an offer price can be generated based on the indirect value associated with the customer segment. However, one skilled in the art will recognize that customer segmentation is not required, and that resource allocation and pricing recommendations may be made for individual customers without employing customer segments and without departing from the essential characteristics of the present invention.

Based on the customer segment (or, alternatively, based on information describing the individual customer), an indirect value for the customer is determined 253. In the context of the casino/hotel operation, such indirect value may represent, for example, gaming revenue that is expected to result from the customer's stay at the hotel. Other types of indirect value may also be determined, as described above. The indirect value may be an expected or actual value, and may be determined based on statistical, predictive, empirical, or other methods.

An initial bid price is obtained 254 for the resource being requested by the customer. This price is determined by conventional means, and may be based on any combination of factors, such as the type of resource, availability, demand, competitive market forces, promotions, and the like. Thus, the initial bid price represents the unadjusted price that would normally be charged for the resource, without taking into account indirect value of a particular customer or customer segment. In one embodiment, the initial bid price is adjusted by various mechanisms, as described in more detail below.

The system then determines 259 whether the resource should be offered to the customer making the request. In one embodiment, this determination is made based on the indirect value of the customer; thus, a customer would only be offered the resource if his or her indirect value (expected or actual) exceeded a threshold value. The threshold value may be fixed, or may depend on availability, day of week, season, or other factors. Thus, in the casino/hotel example, a room might be offered to a customer only if the expected or actual gaming revenue from the customer exceeded a threshold value.

In an alternative embodiment, the determination in step 259 is made based on the total value of the customer, taking into account both direct and indirect value. A total value is determined by combining the initial bid price with the (expected or actual) indirect value, and adjusting the bid price if appropriate. If and only if the total value exceeds a threshold, the resource is offered to the customer.

If in step 259 a determination is made that the resource should not be offered to the customer, the resource is denied 260 to the customer.

If in step 259 a determination is made that the resource should be offered to the customer, the system, in one embodiment, adjusts 255 the initial bid price to take into account the indirect value of the customer. Such an adjustment may be made, for example, by subtracting the indirect value (adjusted by a multiplier value, if desired) from the initial bid price. A minimum adjusted bid price may be set. In an alternative embodiment, step 255 is not performed, and the system does not adjust the initial bid price.

In one embodiment, the system performs the optional step of adjusting 256 the bid price further, to account for market factors such as competitive pressures. For example, if competing hotels are offering rooms at lower prices, the bid price for a room may be adjusted downward in order to remain competitive.

Once all desired adjustments have been made, the resource is offered 257 to the customer at the quoted price.

By performing the above-described steps, the present invention is able to determine, based on indirect value of a customer, whether or not to offer a re-source to a customer and at what price to do so, in order to optimize resource allocation and total revenue.

In an alternative embodiment, the above-described steps are performed in the context of implementing a marketing campaign, so that prospective customers are offered the resource if their indirect or total value exceeds a threshold value. In such an implementation, the above-described steps are initiated in the course of conducting a marketing campaign, rather than in response to a customer's request for a resource. Thus, for example, the above-described analysis might be performed for a set of potential customers, and direct-mail (or other) offers might be made to a subset of the customers, based on their indirect or total value. The offer prices may be tailored to each customer or customer segment, based upon indirect or total value and employing the same value-maximizing techniques described above.

Forecasting and Optimization Model Revenue Management Product

In one embodiment, the present invention is implemented in conjunction with or as a component of a Revenue Management Product as is known in the art. Accordingly, the following description of preferred embodiments of the present invention discusses the invention in the context of such a product for revenue management in a casino/hotel operational context. The particular implementation discussed herein is merely illustrative, and the particular characteristics and operating schemes of the implementation are not intended to limit the scope of the claimed invention.

Conventional revenue management processes for casino/hotel operations attempt to forecast demand and optimize room prices at the revenue management product level. A revenue management product represents a hotel stay and thus has four primary attributes: arrival date, length of stay, room category, and customer segment. A bid price offered to a consumer may depend on any or all of the attributes of the hotel stay.

Arrival date: the date for which the forecast is made, typically the day the customer arrives at the hotel; also referred to as day zero.

Length of stay: the number of room nights the customer spends in the hotel.

Room category: one of any number of predefined room categories, or types. In one embodiment, five room categories are provided, denoted A (highest value) through E (lowest value), plus a sixth category, denoted F, to represent unmanaged rooms for which the system does not forecast demand nor provide inventory control. In one embodiment, all rooms within a particular room category are considered equivalent. Rooms in different room categories are considered to be in distinct and separate inventories. As described below, demand is forecasted and optimized separately for each room category. If desired, sub-groups may be created within room categories, and incremental or intermediate prices may be established for the sub-groups. In this manner, the spread between quoted room prices for the sub-groups can be controlled, and upgrades from one room category to another can be selected based on sub-groups. Rooms within a sub-group are treated as a single inventory for purposes of the present invention.

Customer segment: In one embodiment, customer segments are defined in order to provide greater forecasting accuracy and to ensure that bid prices (i.e. room prices offered to customers) generated from the optimization process will maximize potential value. Customer segments may be defined based on any combination of factors, including for example demographic, psychographic, and behavioral observations and predictions. In one embodiment, 64 customer segments are defined. Segments may be further defined according to whether the customer is incented or un-incented. Incented means the customer has been sent a special offer or invitation to a special event. In one embodiment, an expected indirect value, such as gaming value, is associated with each customer segment. The gaming value can be determined, for example, based on statistical analysis of gaming behavior information collected from customers. The determined value may be continuous or in ranges. In one embodiment, there are six levels of nightly gaming value, including: $0–49; $50–99; $100–149; $150–199; $200–299; and $300+. In addition, the system may provide two levels for unknown status (based on estimates): $0–49; and $50–99. These ranges may be changed as desired, and may be specific to different properties. Those of skill in the art will see that more or fewer ranges may be used, and the range bounds may be changed as desired. A room price may be associated with each level of gaming value, if desired. In one embodiment, there are 12 room rate type, including Comp, Casino, General Reservations 1 through General Reservations 8.

A room price can be established for the customer segment based on the indirect value. A total value for a customer within the customer segment can be determined by adding the average nightly gaming value to the established room price.

For example, if it is determined that a customer segment having a nightly gaming value of $100–149, a room price of General, and a channel of incented has an average nightly gaming value of $132, the discounted room price may be set at $165, giving the segment a total value of $297. The method by which the room price is established will be described in more detail below.

Bid Prices

A bid price is a price at which the resource is offered to a customer. In one embodiment, the present invention tracks up to five types of bid prices: an initial bid price, a optimal bid price, a recommended bid price, a competitive intelligence (CI)-adjusted bid price, and a user-adjusted bid price.

Initial Bid Price. The initial bid price does not take into account the gaming value for the customer segment. The initial bid price is derived by well-known mechanisms for setting prices for resources such as hotel rooms, and may be based on demand, availability, promotional and market considerations, and the like.

Optimal Bid Price. The optimal bid price is a refinement of the initial bid price, and may be segmented according to subcategories such as inventory date and room category. The optimal bid price is the marginal value of the last room available for a particular inventory date and room category, as determined by techniques that are known in the art. In one embodiment, for each inventory date, a "cutoff" value is established to determine whether to accept or reject demand corresponding to different revenue management products.

Recommended Bid Price. The recommended bid price is the price at which the system recommends the resource be offered to the customer, excluding factors associated with the competitive environment. The recommended bid price is derived from either the initial bid price or the optimal bid price by taking into account indirect value, such as actual or expected gaming value, for the customer or customer segment. In one embodiment, the indirect value is discounted by a predefined percentage associated with the particular customer segment. This predefined percentage can be set as desired for each customer segment, based on external factors or user preferences. The discounted indirect value is subtracted from the optimal bid price to determine the recommended bid price. For bid prices that fall below a certain minimum, a predefined "comp" or "casino" price can be substituted.

For example, the optimal bid price for a particular inventory date and room category might be $225, while the actual or expected gaming value for a particular customer segment for that date might be $200. If a 50% discount is applied to the gaming value, a recommended bid price of $125 would be generated. This is calculated by taking the gaming value ($200) after the 50% discount ($100), and subtracting it from the optimal bid price ($225).

CI-Adjusted Bid Price. The CI-adjusted bid price is derived from the recommended bid price, and further takes into account the competitive environment. Competitive prices are provided to adjust the recommended bid price, when appropriate, to be in line with the competition and with market pressures. The CI-adjusted bid price may be activated or deactivated by the user, as desired, and may be the basis for the price at which the resource is offered.

In one embodiment, the CI-adjusted bid price is determined as follows. A set of competitive properties is determined, and a market composite rate is established based on the rates charged by the competitive properties. The difference between the recommended bid price and the market composite rate is then determined. The result is adjusted based upon a weighting factor, which may depend on the booking window for the requested reservation. If the CI-adjusted bid price is below a predefined minimum room price for a given customer segment, the bid price may be adjusted upward as necessary.

For example, if the weighting factor for a particular booking window is 75%, the recommended bid price will be adjusted by 75% of the difference between the recommended bid price and the market composite rate. If the recommended bid price is $175 and the market composite rate is $135, the CI-adjusted bid price would be adjusted downwards by ($175–$135)*0.75, or $30, resulting in a value of $145.

User-Adjusted Bid Price. Once a user has been presented with a recommended bid price or a CI-adjusted bid price, he or she may adjust the bid price if desired, or may override the recommendation altogether. In one embodiment, the present invention tracks user adjustments and takes such adjustments into account when generating bid prices, or when developing statistics for future analysis.

In one embodiment, a set of predefined prices is established, and the bid price generated by the invention serves as an indicator as to which of the predefined prices should be made available to a particular customer. For example, if a recommended bid price (or CI-adjusted bid price) of $89.52 is generated by the system, and the predefined room prices for the hotel include $75.00, $110.00, and $150.00, then the room may be offered to the customer at $110.00, representing the lowest predefined room price that exceeds the recommended bid price.

In one embodiment, if the recommended bid price exceeds all predefined prices, the system recommends that the resource be denied to that customer. Only a customer who has a high enough indirect value to reduce the bid price below at least one of the predefined prices is offered the resource. In an alternative embodiment, the system only recommends that a customer be denied a resource when there is enough demand at higher levels of indirect value to consume the resource.

Gaming Value Tracking

As discussed above, one example of indirect value that may be determined and employed in the context of the present invention is gaming value. Thus, in the context of a casino/hotel operation, customers who generate higher gaming revenue might be offered more favorable room rates.

In one embodiment, the gaming value may be provided as an actual value or an expected value. The value is determined based on actual or predicted gaming behavior by, for example, taking the average daily theoretical win and applying property-specific profitability margins depending on game type and player value ranges.

Expected gaming value (or predicted gaming value) is determined by statistical analysis of the customer's historical gaming behavior, taking into account factors such as the date and time of arrival, length of stay, previous behavioral trends, and the like. Information about the customer's historical gaming behavior is collected using player tracking technology, such as identification cards which are read by slot machines and other gaming machines and which automatically track and accumulate a player's betting patterns. For table-based games, manual tracking of player betting may be utilized, so long as such manually gathered information is accumulated and maintained in the appropriate databases for analysis. Suitable customer tracking technology is described in related U.S. Pat. No. 5,761,647, for "National Customer Recognition System and Method." Accordingly, the expected gaming value represents the expected value of the customer's gaming activity when they visit at the date specified in the reservation.

Actual gaming value represents the actual observed gaming activity for the dates defined by the reservation, and is thus measured after the fact. In one embodiment, actual gaming value is provided to the system as an input to the system of the present invention after the customer has checked out of the hotel, and thus when it is too late to determine a bid price for that hotel stay. However, by taking into account actual gaming value, the invention is able to refine its estimates of estimated gaming value for the customer on future visits and thus more efficiently optimize revenues. In addition, actual gaming value may be used to refine estimates for the customer segment to which the customer belongs. In one embodiment, actual gaming value is used as input for the optimization process of the present invention, and is also discounted and used in a post-optimization process to determine optimal bid prices for customer segments.

Overall Operation

Referring now to FIG. 2A, there is shown a flowchart of the overall operation of a revenue management system employing the present invention in the context of a casino/hotel operation. FIG. 2A illustrates an example of how the techniques of the present invention can be employed in conjunction with demand forecasting and other known techniques, to provide bid price recommendations that optimize resource allocation and revenue management.

Daily demand data is extracted 201 based on bookings, cancellations, and denials. In one embodiment, each property runs a daily process to update values for all forecast statistics based on the most current day's activity. Updating is based on a smoothing technique, such as for example Kalman filters or any other similar technique known in the art. Kalman filters are similar to exponential smoothers, but the smoothing constant, or weight of new data, changes with time as the system weights average demand from the previous eight weeks more heavily than the most recent observation. Thus, the forecast tends to be more stable and does not react violently to new data points.

Forecasted demand data is aggregated 202 into customer segments. Based on the aggregated data, and taking into account special events and segment events, demand forecasts are generated 203 for each customer segment. Generated forecasts predict demand in terms of unconstrained arrivals, i.e. the total number of arrivals that would stay at the hotel if there were sufficient room for all. Deseasonalized arrivals demand is multiplied by a seasonal adjustment factor and, if necessary, by a revenue management event factor to take into account special circumstances and events. The resulting forecast predicts demand in terms of total arrivals for any given day in a year.

For each customer segment, as well as current hotel capacity and data describing room rates at competing local hotels, optimization 204 is performed, using the techniques described above in connection with FIG. 2B to generate bid prices that maximize total revenue and optimally allocate resources. For each customer segment, a recommended bid price is developed that takes into account the expected gaming value of customers in that segment. If desired, competitive pressures are also taken into account, as described above.

Optimization step 204 takes into account the remaining demand forecast and remaining available capacity, using techniques that are known in the art, in order to generate optimal bid prices by inventory date and room category. These bid prices are used by reservation agents to recommend room prices. In addition to generating recommended bid prices, the optimization step 204 generates overbooking recommendations based on forecasts of no-shows and cancellations. Overbooking recommendations are generated by inventory date and room category. Overbooking adjustments are added to the optimizable capacity, so as to define the availability of rooms for generating bid prices, according to techniques that are known in the art.

Once optimized bid prices are generated, the prices are filtered 205 to set appropriate prices. For example, prices may be rounded up or otherwise adjusted to match industry norms, according to techniques that are known in the art.

In one embodiment, filtering 205 is performed based on control segments determined by reference to average daily gaming values. Pricing and availability determinations may be made at the control segment level. For example, eight control segments, made up of 64 customer segments, might be established, according to the following table:

| Control segment | Segment Description |
| --- | --- |
| 1 | Nightly Gaming Value >= $300 |
| 2 | $200 <= Nightly Gaming Value < $300 |
| 3 | $150 <= Nightly Gaming Value < $200 |
| 4 | $100 <= Nightly Gaming Value < $150 |
| 5 | $50 <= Nightly Gaming Value < $100 |
| 6 | Nightly Gaming Value < $50 |
| 7 | Unknown customer with expected Nightly Gaming Value >= $50 |
| 8 | Unknown customer with expected Nightly Gaming Value < $50 |

Recommendations are generated 206 and output 207 for various rooms customer segment combinations. These output recommendations take into account all of the above-mentioned factors, including room category, control segment, gaming value, and competitive information. In one embodiment, recommendations are provided in response to individual customer requests for rooms; in another embodiment, recommendations are provided in connection with a marketing campaign, so as to provide bid prices at which rooms are offered in the campaign.

Recommended bid prices thus take into account the gaming value of the customer, as well as other factors such as demand and availability. In one embodiment, a user (such as a booking agent) may override system recommendations when quoting room prices. As discussed above, overrides or modified forecasts are provided as supplemental inputs to the system, and may be taken into account when re-optimizing to generate new recommendations for future room quotes.

In one embodiment, when the user overrides the system's recommendation, he or she may initiate re-optimization (or such operation may occur automatically), which may in turn result in updates to bid price recommendations. In one embodiment, overrides are not persistent unless the user re-optimizes and uploads new recommendations.

In one embodiment, user overrides are limited, so that a user may override a bid price recommendation only by replacing the recommended bid price with a "comp" or casino price that may be predefined for each particular property. Defaults may also be provided.

In one embodiment, overrides, whether default or manually applied by the user, are persistent. The identified override price remains as the recommended bid price for that property and customer segment, until otherwise changed.

System Components

In one embodiment, the present invention is implemented as a combination of computer-implemented systems and business processes. The computer system for implementation of the present invention may be, for example, a Unix-based computer such as available from Hewlett-Packard Corporation of Palo Alto, Calif. The system of the present invention includes several interrelated functional components. Each of these will be described in turn, in connection with a system for generating bid prices for a casino/hotel operation according to the present invention.

Figure 3:
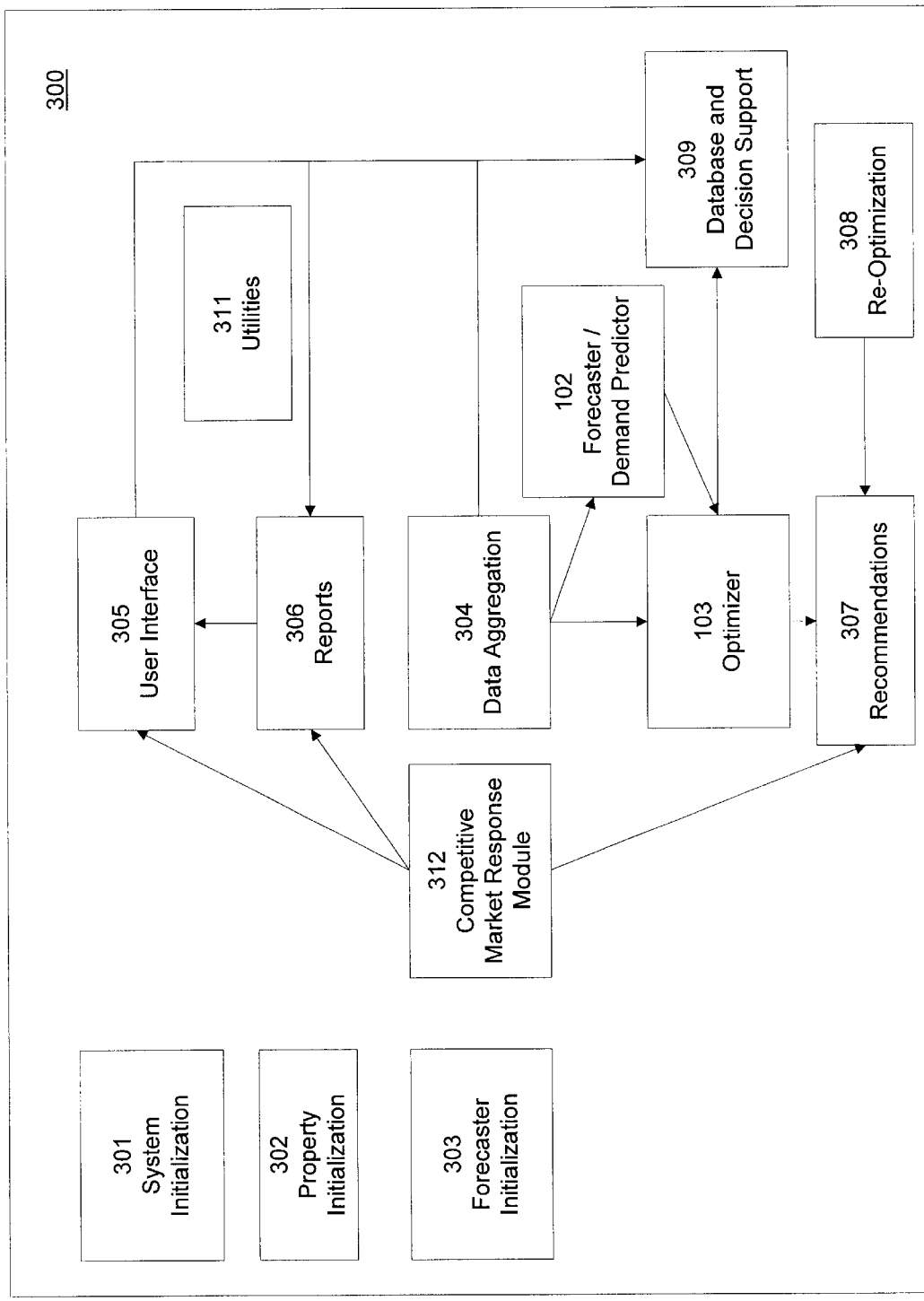
FIG. 3 is a block diagram showing system components of one embodiment of the invention.

Referring now to FIG. 3, there is shown a block diagram of functional components of system 300, according to one embodiment of the invention. Details of the operation of the various functional components are also provided below, in connection with the description of the user interface according to one embodiment of the invention.

System Initialization 301: Prepares file systems, creates the system database, and establishes the environment for system operation Server platform is initialized and system code and databases for tracking hotel properties, bookings, gaming, customers, and the like are implemented, according to techniques that are known in the art.

Property Initialization 302: Prepares an individual property (hotel) for integration into the functionality of the system. Creates and configures a property database on the server platform that is ready to include in daily processing activity. In one embodiment, an initialization script is invoked to create the database, load historical data, and execute initializations, according to techniques that are known in the art.

Forecaster Initialization 303: Includes long-term initialization, which produces seasonality and other statistics for forecaster 102 and optimizer 103. These values are derived from analysis of historical demand patterns for each property. Default statistical values for forecasting are developed.

Also includes short-term initialization, which develops rolling average statistics used by forecaster 102, according to techniques that are known in the art. Simulates daily data aggregation and statistical update processing for a number of capture dates.

Data Aggregation 304: Loads daily reservations and status data for each property, and aggregates into buckets related to revenue management. This is accomplished by loading data extract files into a staging area, and calling data aggregation scripts to process the data into tables, according to techniques that are known in the art. Data aggregation 304 takes input from data capture, control curve, room type category detail, yield GNR transactions, price code, and lost business data. The results stored in database tables for use by forecaster 102, optimizer 103, and decision support tools 309.

User Interface 305: Facilitates user interaction with system 300 via screen displays, keyboard and mouse input interfaces, and the like.

Reports 306: Facilitates selecting scheduling, viewing, and printing output. Reports 306 are viewed, in one embodiment, through user interface 305 or through a web interface, as for example via an intranet.

Forecaster/Demand Predictor 102: Generates demand forecasts for each day in the forecast horizon, for each property, according to techniques that are known in the art. These forecasts are used by optimizer 102 and decision support tools 309. Forecaster 102 determines forecasts using transaction data, business statistics, daily arrival information, and the like. Data for forecaster 102 is generally aggregated by aggregator 304.

Optimizer 103: Maps projected demand from forecaster 102 to available inventory, and recommends optimal bid prices and overbooking levels by inventory date and room category. Bid prices are adjusted by gaming value to generate bid price recommendations for recommendations module 307, as described above. Performs mapping for each day in the forecast horizon.

Recommendations 307: Filters results of optimizer 103 to a level that can be controlled by the booking process, and generates bid prices and overbooking recommendations for each customer segment in each room category. In one embodiment, competitive market response module 312 determines a market composite price based on room prices charged by competing hotel properties, and recommendations 307 are automatically adjusted based on the market composite price to generate a CI-adjusted bid price, as described above.

In one embodiment, recommendations module 307 checks against current recommendations in the reservation environment to produce new recommendations only when the current recommendations differ from the optimal recommendations generated by optimizer 103. An action index scales recommendations by a sliding numeric scale, based on the revenue consequences of failure to accept the recommendations. The action index measures relative impact of a recommendation compared with the most revenue impacting inventory date. Thresholds may be defined, specifying when recommendations should not be sent, or should automatically be accepted ("auto-piloted"), or should be recommended for review. Recommendations module 307 further processes overbooking and bid price recommendations, as well as reservation requests based on gaming value and other customer segment factors.

In one embodiment, recommendations may be automatically transmitted, or held for manual review by a user, or both, as desired. Automatic transmission can be effected as part of a periodic batch process, for example on a daily basis. Alternatively, recommendations may be transmitted in response to users flagging generated recommendations and/ or building transaction updates via user interface 305. Received recommendations can be integrated into reservation booking systems so that future bookings automatically take into account the recommended bid prices and overbooking levels.

In one embodiment, recommendation files are divided by property, for improved distribution of transaction load. One example of the file format that is generated by the present invention contains records with the following fields:

| Field Name | Description |
|---|---|
| Recommendation ID | Unique identifier for the recommendation |
| Hotel ID | Unique identifier for the hotel or property |
| Arrival Date | Day of arrival for the data in this record |
| Customer Segment | Unique identifier for the customer segment |
| Room Type Category | Unique identifier for the room type category |
| Bid Price | Recommended bid price for this arrival date, room type category, and customer segment |
| Breakpoint | Recommended breakpoint for this arrival date, room type category, and customer segment |
| Recommended Overbooking Level | Recommended overbooking level for this arrival date, room type category, and customer segment |

Recommendation files, once received, are processed by the receiving system. Once processing is complete, a recommendations result file may be transmitted back to recommendations module 307, containing the original recommendation record identifier plus an indicator of the status of the recommendation (success or error). The result may optionally contain error text, if applicable. An example of the format for the result file is as follows:

| Field Name | Description |
|---|---|
| Recommendation ID | Unique identifier for the recommendation |
| Recommendation Type | Type of recommendation: bid price, or overbooking |
| Response Code | 0 = success; 1 = failure |
| Response Message Text | Error message stating reason for failure, if applicable |

Re-Optimization 308: Provides functionality for re-optimizing overbooking and bid prices after changing forecasts. The user can override the forecasted demand and re-optimize overbooking and bid-price recommendations for the room category in question Re-optimization 308 is initiated when the user overrides the forecast for one or more recommendations and/or manually triggers a re-optimization. In response, re-optimization is performed to generate new overbooking and bid prices, which are then provided to the user for review.

Database and Decision Support 309: Maintains aggregated daily demand data, forecasts and supporting statistics, and optimization results, for use in reporting and other decision support functions, according to techniques that are known in the art.

Database 309 acts as a data store for revenue management data (property databases) and system information, and may be implemented using any commercially available database. Database 309 provides structures and processes for transforming transaction data into revenue management data, and provides input to and stores output of forecaster/demand predictor 102 and optimizer 103 modules. Database 309 also provides a consistent data set for reports module 306, and may be a data source for third-party reporting tools.

Database 309 is used by aggregation module 304 to store aggregated data. Forecaster 102 reads aggregated data from database 309 and stores statistics in database 309. Optimizer 103 reads statistics from database 309 and stores recommendations in database 309. Database 309 also stores defined parameters and overrides received from user interface 305, and provides data for reports 306. A purge process (which may be included in utilities 311) may be provided to delete or archive historical data older than a specified amount of time, from database 309.

Utilities 311: Performs various system utilities, such as task generation and report generation. For example, a task scheduler executes a sequence of batch jobs in a Unix server environment, including data aggregation, forecasting, optimization, and reporting activities, of various modules of system 300. On-demand jobs such as user reports may also be managed through the task scheduler. Daily, weekly, or monthly jobs may be specified and executed.

A report generator provides functionality for query and display of data intabular form. Data for the reports may be extracted from database 309, as specified by the user. Query criteria may be customized and saved for future use, as is known in the art of report generation. Reports may be scheduled to run on a periodic basis, or executed on demand. Predefined report types may be provided, and customization functions available for the predefined report types.

Competitive Market Response Module 312: In one embodiment, as described above, the present invention develops a CI-adjusted bid price, which takes into account competitive market information. Functionality for developing the CI-adjusted bid price may be included in recommendations module 307, or may be provided in a separate Competitive Market Response (CMR) module 312.

The competitive market response functionality of the present invention allows a user to enter data describing competitive room prices, which may be obtained from published advertising or by inquiring at competing hotels. Data from targeted competitors is weighted to determine a market composite price reflecting overall market conditions for a particular type of room CMR module 312 adjusts recommended bid prices according to the determined market composite price.

In one embodiment, CMR module 312 operates as follows. User interface 305 includes a screen for establishing a number of targeted competitors, along with assigned weights for each. The market composite price is determined by weighted average among the applicable room prices of the targeted competitors.

User interface 305 includes a second screen for inputting competing prices. A user may call competing properties and/or enter prices from published ads or listings. This screen may also be used for viewing and editing previously entered prices. Alternatively, a data extract procedure may be implemented which facilitates the input of competing prices by an automated process, such as from online sources.

After optimizer 103 determines optimal bid prices, CMR module 312 makes adjustments based on the variance between the determined bid price and the market composite price. A market influence parameter may be established, to specify how strongly the variance affects the recommended bid price. In one embodiment, the percentage change resulting from the application of CMR module 312 is similarly applied to other room categories, so as to keep other room categories priced appropriately within the competitive environment. CMR module 312 may be implemented so as to automatically adjust prices, or to prompt the user before adjustments are made. If desired, adjustment recommendations can be displayed even when they are not adopted.

In one embodiment, CMR module 312 and user interface 305 implement additional functionality related to competitive prices. For example, UI screens may be provided for price comparison impact data, displaying changes in quoted prices and market composite prices. Denial data is also displayed, so that the user can infer changes in demand caused by fluctuations in market composite. prices. For example, a first graph may show room price information, including composite price, quoted price, initial bid price, CI-adjusted bid price, and recommended bid price. A second graph may show denial statistics, including rooms sold, denials, and regrets. Both graphs may be displayed along a time axis showing days in the planning horizon. Thus, the user is able to identify increases in denials, decreases in rooms sold, and data showing whether these changes are caused by changes in market composite prices. Adjustments can then be made based on the displayed data. Reports containing this information may also be generated.

In one embodiment, a market influence screen may also be provided as part of user interface 305 in conjunction with CMR module 312. The market influence screen enables a user to specify and maintain parameters for automated adjustment of bid prices and/or room prices in response to significant variance between the market composite price and quoted prices. The user specifies market influence factors to determine the level of response to variances. Factors range from 0% to 100%, and are multiplied by the measured variance to determine the automatic adjustment to bid prices and room prices. Separate factors may be specified for different days of the week, time periods, or other subdivisions. In one embodiment, variance is measured for one room category, such as the lowest-value room category; in other embodiments more than one room category may be monitored. The present invention adjusts bid prices and room prices by the variance from market composite price, multiplied by the appropriate influence factor, to obtain adjusted bid prices and room prices.

In addition, a competitor price report, and other reports, may be generated and output by reports module 306, based on data from CMR module 312.

User Interface

In one embodiment, the present invention is implemented as functionality in a computer system for revenue management, according to techniques that are known in the art. User interface 305 facilitates user access to the features and benefits of the invention, and in particular provides means for input and access to stored and generated data related to hotel revenue management functions. The following description of several screens included in user interface 305 is merely exemplary; one skilled in the art will recognize that many other designs or types of screens may be provided without departing from the invention as claimed.

Recommendations Review Screen

Referring now to FIG. 4, there is shown a screen shot of a recommendations review screen 2000. Screen 2000 provides functionality for reviewing and modifying initial bid price and overbooking recommendations. Current values 2001 are displayed, including the date, property, days left, forecast total sold, status, overbooked quantity, manager hold, total demand, out-of-order rooms, actual capacity, current group block, current group sold, and current group available.

Table 2002 shows overbooking levels for each room category, including recommended levels, current levels, and adjusted levels. Additional fields as displayed in one embodiment include current sold, forecasted sold, forecasted no-shows, capacity, and remaining sold forecast. Action index 2003 is also displayed, as described above. Table 2004 shows, for a number of customer segments, the unadjusted forecast demand, user adjustment, adjusted forecast demand, initial bid price, recommended bid price, and adjusted bid price.

When the user chooses to adjust the forecasted demand or bid price, he or she right-clicks on the targeted recommendation. A pop-up screen, shown in FIG. 5, facilitates entry of modified forecast or bid price. Event button 2005 allows access to event information. Optimize button 2006 initiates re-optimization based on the newly modified information. OK button 2007 enters all changes and dismisses screen 2000. Cancel button 2008 dismisses screen 2000 without entering changes.

Adjust Bid Price Screen

Referring now to FIG. 5, there is shown a screen shot of an adjust bid price screen 2100. Screen 2100 provides functionality for adjusting forecasted demand or bid prices.

The user is able to review previously adjusted bid prices or adjusted forecast demand, and disable previous adjustments if desired.

In one embodiment, screen 2100 is presented when the user right-clicks on a targeted recommendation in screen 2000, or when the user selects an appropriate command from the main screen. In one embodiment, screen 2100 also includes a description of the day of week, room category, and customer segment that apply to the bid price being modified. Screen 2100 contains fields for unadjusted forecast demand 2101, user-adjusted demand 2102 (modifiable), adjusted forecast demand 2103, initial bid price 2105, recommended bid price 2106, CI-adjusted bid price 2107, user-adjusted bid price 2108 (modifiable), and "comp" and casino price override 2109. Checkboxes for removing previous adjustments 2104 and removing price overrides 2110 are also provided. OK button 2111 accepts the user's changes and dismisses screen 2100. Cancel button 2112 dismisses screen 2100 without accepting changes.

One skilled in the art will recognize that many other screens may be provided in connection with the present invention.

Reports

The system generates various types of reports, as are known in the prior art and as improved by the present invention, based on stored and generated data, including forecasts, optimizations, recommendations, booking data, and the like. Reports may be generated in response to user requests, or they may be automatically generated at specified times.

In general, reports generated by the present invention can be viewed on a user's workstation or monitor, or printed, or exported onto magnetic media, or trasmitted across a network, according to techniques that are known in the art. In particular, users can view reports through user interface 305 or using a browser via a network such as an intranet.

The invention advantageously provides gaming reports which provide users with useful information related to gaming value.

Casino Block Analysis Report: A comparison of group and casino bookings with respective blocks defined. Shows transient actual sold, forecast transient demand, and recommended optimal sold.

Competitor Price Report: A listing of competitors' prices, along with respective weights.

Historic Revenue/Yield Report A summary of yield and revenue performance for both room prices and gaming value.

Network Configuration

Figure 6:
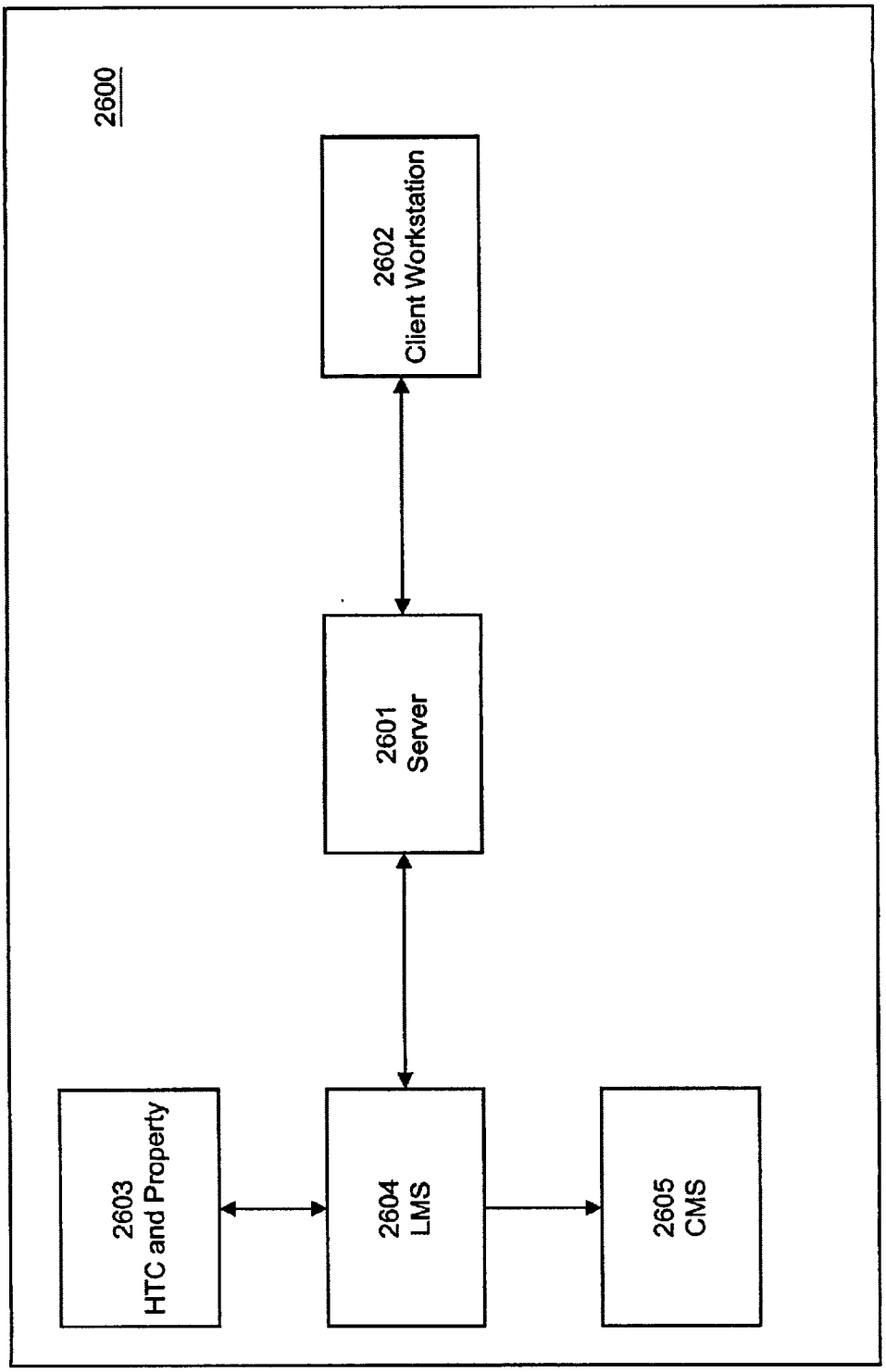
FIG. 6 is a block diagram of a network configuration for implementing the present invention.

Referring now to FIG. 6, there is shown a block diagram of a network 2600 configuration useful for implementing an embodiment of the present invention. In one embodiment, the present invention is implemented on a client/server architecture including a database and application server 2601, which acts as a central repository and which generates the forecast and optimization data and processes. Users access the data in the system via workstations 2602 connected over a network. Individual users may have different access rights and privileges, which are set and controlled via user accounts and security groups, as is known in the art. Users may be hotel employees, or even individual customers themselves, accessing the server 2601 via the Internet to obtain room reservations.

Lodging Management System (LMS) 2604 connects to server 2601 and supplies data used by the various functional modules of the present invention. Inventory control recommendations generated by the invention are transmitted to LMS 2604 and applied to LMS inventory counts.

LMS 2604 also receives data from a telephone center and properties 2603, and communicates with Casino Management System (CMS) 2605. The operation of these components is described in related U.S. Pat. No. 5,761,647, for "National Customer Recognition System and Method."

User interface functionality, including viewing reports, accepting and rejecting recommendations, and system maintenance, is accomplished via various ones of the client workstations 2602. Communications with server 2601 is facilitated by conventional network protocols and hardware. In one embodiment, client access via workstations 2602 operates via a browser interface over a network such as an intranet.

From the above description, it will be apparent that the invention disclosed herein provides a novel and advantageous system and method of optimizing prices for a resource, by taking into account multiple value sources, including indirect value. The foregoing discussion discloses and describes merely exemplary methods and embodiments of the present invention. In particular, the above-described embodiments present the invention in the context of a casino/hotel operation in which room rates are optimized based on actual or expected gaming value of customers. As will be understood by those familiar with the art, the invention may be embodied in other specific forms without departing from the spirit or essential characteristics thereof. For example, other operational architectures, data formats, architectures, applications, user interfaces, and process flow schemes may be used. Accordingly, the disclosure of the present invention is intended to be illustrative, but not limiting, of the scope of the invention, which is set forth in the following claims.

What is claimed is:

1. A computer-implemented method of managing a resource, comprising:

receiving, in a computer, a request for an instance of the resource for a customer;

determining, in the computer, an indirect value potentially resulting from providing the resource instance to the customer and based on at least one characteristic of the customer, wherein the indirect value is based on a customer gaming value; and responsive to the indirect value exceeding a threshold, offering the resource instance to the customer.

2. The method of claim 1, wherein determining an indirect value comprises determining an indirect value based on a customer segment associated with the customer.

3. A computer-implemented method of managing a resource, comprising:

receiving, in a computer, a request for an instance of the resource for a customer;

determining, in the computer, an indirect value potentially resulting from providing the resource instance to the customer and based on at least one characteristic of the customer, wherein the indirect value is based on a customer gaming value;

determining, in the computer, a price at which to offer the resource instance to the customer, the price being determined as a function of the indirect value; and offering the resource instance to the customer at the determined price.

4. The method of claim 3, wherein determining a price at which to offer the resource instance takes into account forecasted demand and projected response to marketing activities related to at least one special event.

5. The method of claim 3, wherein the indirect value is based on a customer segment associated with the customer.

6. The method of claim 3, wherein determining a price comprises determining a price to maximize total value including direct value and indirect value.

7. The method of claim 6, wherein the resource comprises a set of hotel rooms, the direct value comprises a room rate, and the indirect value comprised gaming values.

8. The method of claim 3, wherein determining a price at which to offer the resource instance takes into account forecasted demand and projected response to marketing activities.

9. The method of claim 3, wherein the resource has a type and wherein determining a price for the resource takes into account forecasted demand for the resource type.

10. A computer-implemented method of managing a resource, comprising:
receiving, in a computer, a request for an instance of the resource for a customer;
determining, in the computer, an indirect value potentially resulting from providing the resource instance to the customer and based on at least one characteristic of the customer;
determining, in the computer, a price at which to offer the resource instance to the customer, the price being determined as a function of the indirect value, wherein the indirect value is based on a customer gaming value;
responsive to the determined price exceeding all prices in a predefined set of prices, denying the resource instance to the customer; and
responsive to the determined price not exceeding all prices in a predetermined set of prices, offering the resource instance to the customer at a minimum price in the predefined set of prices that exceeds the determine price.

11. A computer-implemented method of managing value for a property, comprising:
receiving, in a computer, a request for a room for a customer;
determining, in the computer, an indirect value potentially resulting from providing the room to the customer and based on at least one characteristic of the customer, wherein the indirect value is based on a customer gaming value; and
responsive to the indirect value exceeding a threshold, offering the room to the customer.

12. The method of claim 11, wherein determining an indirect value comprises determining an indirect value based on a customer segment associated with the customer.

13. A computer-implemented method of managing value for a property, comprising:
receiving, in a computer, a request for a room for a customer;
determining, in the computer, a potential gaming value of the customer;
determining, in the computer, a price at which to offer the room to the customer, the price being determined as a function of the estimated gaming value of the customer; and
offering the room to the customer at the determined price.

14. The method of claim 13, wherein determining a price at which to offer the room takes into account forecasted demand and projected response to marketing activities.

15. The method of claim 13, wherein determining a price at which to offer the room takes into account forecasted demand and projected response to marketing activities related to at least one special event.

16. The method of claim 13, wherein the potential gaming value is based on a customer segment associated with the customer.

17. The method of claim 13, wherein determining a price comprises determining a price to maximize total value including aggregate room value and aggregate gaming value.

18. The method of claim 13, wherein the room has a type and wherein determining a price for the room takes into account forecasted demand for the room type.

19. The method of claim 13, wherein the estimated gaming value of the customer is derived from past gaming behavior of the customer.

20. The method of claim 13, wherein the estimated gaming value of the customer is derived from demographic characteristics of the customer.

21. The method of claim 13, further comprising:
receiving, in the computer, at least one room price for at least one second property; and
adjusting, in the computer, the determined price responsive to the received room price.

22. The method of claim 13, further comprising:
receiving, in the computer, a composite price representing competing room prices; and
adjusting, in the computer, the determined price responsive to the composite price.

23. The method of claim 13, further comprising:
receiving, in the computer, a composite price representing a weighted average of competing room prices; and
adjusting, in the computer, the determined price responsive to the composite price.

24. A computer-implemented method of managing value for a property, comprising:
receiving, in a computer, a request for a room for a customer;
determining, in the computer, an estimated gaming value of the customer;
determining, in the computer, a price at which to offer the room to the customer, the price being determined as a function of the estimated gaming value of the customer;
responsive to the determined price exceeding all prices in a predefined set of prices, denying the room to the customer; and
responsive to the determined price not exceeding all prices in a predetermined set of prices, offering the room to the customer at a minimum price in the predefined set of prices that exceeds the determined price.

25. The method of claim 24, wherein determining the estimated gaming value of the customer comprises:
classifying, in the computer, the customer into one of a plurality of customer segments; and
determining, in the computer, the expected gaming value associated with the customer segment into which the customer is classified.

26. The method of claim 25, wherein classifying the customer comprises determining an applicable customer segment responsive to past gaming behavior of the customer.

27. The method of claim 25, wherein classifying the customer comprises determining an applicable customer segment responsive to demographic characteristics of the customer.

28. A computer-implemented method of managing resource, comprising:

receiving, in a computer, a request for an instance of the resource for a customer;

determining, in the computer, at least two sources of value potentially resulting from providing the resource instance to the customer, at least one of the sources of value being based on at least one characteristic of the customer, wherein at least one of the sources of value is based on a customer gaming value; and responsive to the sum of the two sources of value exceeding a threshold, offering the resource instance to the customer.

29. The method of claim 28, wherein at least one of the sources of value is based on a customer segment associated with the customer.

30. A computer-implemented method of managing a resource, comprising:

receiving, in a computer, a request for an instance of the resource for a customer;

determining, in the computer, at least two sources of value potentially resulting from providing the resource instance to the customer, at least one of the sources of value being based on at least one characteristic of the customer;

determining, in the computer, a price at which to offer the resource instance to the customer, the price being determined as a function of the at least two sources of value, wherein at least one of the sources of value is based on a customer gaming value; and offering the resource instance to the customer at the determined price.

31. A computer-implemented method of managing a resource comprising:

receiving a request for an instance of the resource for a customer;

determining at least two sources of value potentially resulting from providing the resource instance to the customer, at least one of the sources of value being based on at least one characteristic of the customer, wherein at least one of the sources of value is based on a customer gaming value; and responsive to the sum of the two sources of value exceeding a threshold;

determining a price for the resource instance as a function of the sum of the at least two sources of value; and offering the resource instance to the customer.

32. The method of claim 31, wherein the at least two sources of value comprise a direct value and an indirect value.

33. The method of claim 32, wherein the resource comprises a set of hotel rooms, the direct value comprises a room rate, and the indirect value comprises gaming value.

34. A system for managing a resource, comprising:

an input device, for receiving a request for an instance of the resource for a customer;

an optimizer module, coupled to the input device, for determining an indirect value potentially resulting from providing the resource instance to the customer and based on at least one characteristic of the customer, wherein the indirect value is based on a customer gaming value; and an output device, coupled to the optimizer module, for, responsive to the indirect value exceeding a threshold, offering the resource instance to the customer.

35. A system for managing a resource, comprising:

an input device, for receiving request for an instance of the resource for a customer;

an optimizer module, coupled to the input device, for determining an indirect value potential resulting from providing the resource instance to the customer and based on at least one characteristic of the customer, wherein the indirect value is based on a customer gaming value;

a pricing module, coupled to the optimizer module, for determining a price for the resource instance as a function of the indirect value; and an output device, coupled to the pricing module, for, offering the resource instance to the customer at the determined price.

36. A computer program product comprising a computer-usable medium having computer-readable code embodied therein for managing a resource, comprising:

computer-readable program code configured to cause a computer to receive a request or an instance of the resource for a customer;

computer-readable program code configured to cause a computer to determine an indirect value potentially resulting from providing the resource instance o the customer and based on at least one characteristic of the customer, wherein the indirect value is based on a customer gaming value; and computer-readable program code configured to cause a computer to, responsive to the indirect value exceeding a threshold, offer the resource instance to the customer.

37. A computer program product comprising a computer-usable medium having computer-readable code embodied therein for managing a resource, comprising:

computer-readable program code configured to cause a computer to receive a request for an instance of the resource for a customer;

computer-readable program code configured to cause a computer to determine an indirect value potentially resulting from providing the resource instance to the customer and based on at least one characteristic of the customer; and computer-readable program code configured to cause a computer to determine a price for the resource instance as a function of the indirect value, wherein the indirect value is based on a customer gaming value; and computer-readable program code configured to cause a computer to offer the resource instance to the customer at the determined price.

* * * * *

UNITED STATES PATENT AND TRADEMARK OFFICE
CERTIFICATE OF CORRECTION

PATENT NO. : 6,993,494 B1
DATED : January 31, 2006
INVENTOR(S) : John M. Boushy and Timothy J. Wilmott Page 1 of 1

It is certified that error appears in the above-identified patent and that said Letters Patent is hereby corrected as shown below:

<u>Column 21,</u>
Line 6, replace "comprised" with -- comprises --; and replace "values" with -- value --.
Lines 33-34, replace "determine" with -- determined --.

<u>Column 24,</u>
Line 9, replace "receiving request" with -- receiving a request --.
Line 12, replace "potential" with -- potentially --.
Line 27, replace "or" with -- for --.
Line 31, replace "o the" with -- to the --.

Signed and Sealed this

Twenty-fifth Day of April, 2006

JON W. DUDAS
*Director of the United States Patent and Trademark Office*